US011677863B1

(12) United States Patent
Ternyak et al.

(10) Patent No.: US 11,677,863 B1
(45) Date of Patent: Jun. 13, 2023

(54) MEDIATED ACTIVE CALL INITIATION IN BROWSERS

(71) Applicant: ServiceBell, Inc., Las Vegas, NV (US)

(72) Inventors: Daniel Ternyak, Las Vegas, NV (US); William O'Beirne, Austin, TX (US); Aaron Stricker, St. Paul, MN (US)

(73) Assignee: ServiceBell, Inc., Las Vegas, NV (US)

( * ) Notice: Subject to any disclaimer, the term of this patent is extended or adjusted under 35 U.S.C. 154(b) by 0 days.

(21) Appl. No.: 17/692,011

(22) Filed: Mar. 10, 2022

(51) Int. Cl.
| | | |
|---|---|---|
| H04L 12/58 | (2006.01) | |
| H04L 29/06 | (2006.01) | |
| H04L 29/08 | (2006.01) | |
| H04L 69/16 | (2022.01) | |
| H04L 67/104 | (2022.01) | |
| H04N 7/14 | (2006.01) | |
| H04L 65/1069 | (2022.01) | |
| H04L 51/046 | (2022.01) | |
| H04L 65/403 | (2022.01) | |

(52) U.S. Cl.
CPC .......... H04L 69/162 (2013.01); H04L 51/046 (2013.01); H04L 65/1069 (2013.01); H04L 65/403 (2013.01); H04L 67/104 (2013.01); H04N 7/147 (2013.01); H04N 7/148 (2013.01)

(58) Field of Classification Search
CPC ....... H04L 51/00; H04L 51/04; H04L 51/046; H04L 51/21; H04L 65/00; H04L 65/1066–1069; H04L 65/40; H04L 65/403
See application file for complete search history.

(56) References Cited

U.S. PATENT DOCUMENTS

| | | | | |
|---|---|---|---|---|
| 10,904,481 | B1* | 1/2021 | Morris | H04L 65/611 |
| 2014/0126714 | A1* | 5/2014 | Sayko | H04L 65/1069 |
| | | | | 379/265.09 |
| 2015/0046544 | A1* | 2/2015 | Li | H04L 67/1095 |
| | | | | 709/206 |
| 2017/0230329 | A1* | 8/2017 | Akef | H04L 67/02 |
| 2018/0159901 | A1* | 6/2018 | Chatras | H04L 67/141 |
| 2018/0295160 | A1* | 10/2018 | Johnson | H04L 65/1108 |
| 2020/0028968 | A1* | 1/2020 | Mendiratta | H04M 3/5238 |
| 2021/0075832 | A1* | 3/2021 | Bisztrai | H04L 65/1069 |
| 2021/0160584 | A1* | 5/2021 | April | H04L 65/611 |
| 2022/0014711 | A1* | 1/2022 | Eskafi | H04L 12/1813 |
| 2022/0345780 | A1* | 10/2022 | Shem Tov | H04N 21/44218 |
| 2023/0008199 | A1* | 1/2023 | Yu | H04N 21/23418 |

* cited by examiner

Primary Examiner — Boris D Grijalva Lobos
(74) Attorney, Agent, or Firm — Baker Botts L.L.P.

(57) ABSTRACT

An efficient computer-implemented method that allows an owner of a website to initiate voice and/or video calls with clients that are visiting the website of the owner in a manner that is simple for the visitor and can use fewer network resources than in prior approaches. The visit of the client to the website causes creating a socket connection between the client and the server. The server executes an application program to maintain a list of connected clients, and various metadata about the clients, which is presented to the website owner in an interface display. The owner can select any particular client among all the clients in the list, to initiate a peer-to-peer connection with that particular client and begin a call with them. The process executes without the client explicitly requesting a call. Consequently, a visitor to a website, and a representative of the website, can establish an audiovisual call rapidly and efficiently, then immediately begin addressing questions, requests, or requirements of the visitor.

27 Claims, 5 Drawing Sheets

MEDIATED ACTIVE CALL INITIATION IN BROWSERS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021-2022 ServiceBell, Inc.

TECHNICAL FIELD

One technical field of the present disclosure is video call initiation in client-server distributed computing systems. Another relevant technical field is server control of the execution of browsers of client computing devices, using browser-executed script code.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Client-server distributed computing systems are widely used worldwide. In one example of use, individual consumers who are interested in finding, reviewing, or obtaining products or services can use a client computing device, which executes a browser program, to contact an internet-based server computer of a merchant or service provider who owns or operates the server computer. Using protocols such as HTTP and HTML, the client computing device can request pages of data from the server computer, then render and display the pages at the client computing device.

When consumers have questions about products or servers of merchants or service providers, live, real-time oral and/or visual communication can lead to rapid resolution of questions or comments. At present, the primary means for consumers to initiate communications is online chat; many merchant websites automatically display offers to initiate a text-based chat between the consumer and a customer service representative. While text-based chat has benefits, audiovisual communication often is faster, more efficient, and results in fewer misunderstandings. Text-based chat can require far more network message roundtrips than may be necessary to complete a conversation, so owners and operators of server computers desire more efficient use of resources.

While video calls over the internet are possible, individual consumers vary widely in their familiarity with video call systems and how to initiate calls. The consumer may be unsure which video call client to use, or how to contact a representative at the merchant or server owner to start a video call.

Based on the foregoing, there is an acute need for an improved technical means of initiating calls between client computing devices, including those with browsers, and server computers, as well as a need for an efficient approach that uses fewer resources than in present practice.

SUMMARY

The appended claims may serve as a summary of the invention.

BRIEF DESCRIPTION OF THE DRAWINGS

In the drawings.

Each of FIG. 3A.

DETAILED DESCRIPTION

Figure 1A:
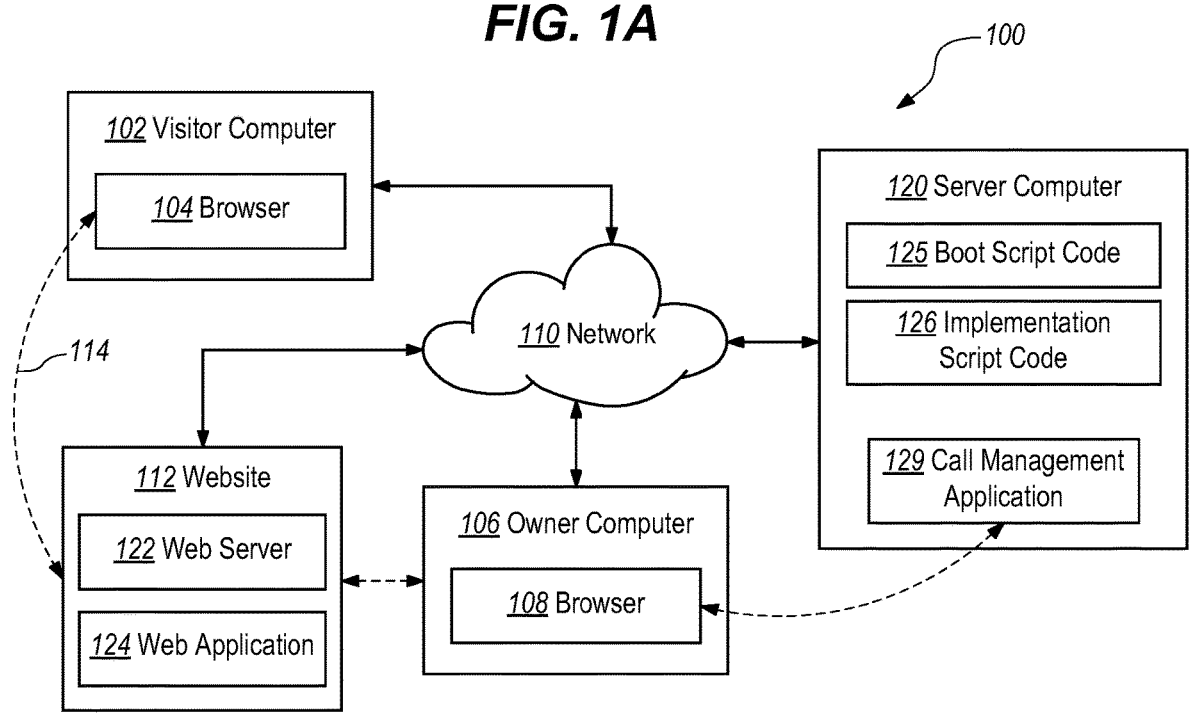
FIG. 1A illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
  1. General Overview
  2. Structural & Functional Overview
  2.1 Example Distributed Computer System
  2.2 Example Functional Implementation
  2.3 User Interface Examples
  2.4 Processing Method in Detail
  2.5 Agent View of Visitor Web Browsing Activity
  3. Implementation Example—Hardware Overview
  1. General Overview In one embodiment, the disclosure provides a computer-implemented method that allows an owner of a website, or an agent or representative of the owner of the website, to initiate voice and/or video calls with clients that are visiting the website of the owner. The client or visitor browses the website. When a browser of the client or visitor accesses the website, the browser receives, embedded in code defining a home page of the website, script code that the browser executes, causing creation of a socket connection from the browser to a call management server of a service provider that is separate from the web site and its owner. As socket connections open with different visitors, agents or representatives of the web site or its owner can access a management page that lists the connections. The agent or representative can select a visitor or client in the management page and initiate a video call to the client or visitor. The client or visitor receives a request to join a video call that the agent or representative initiated, and the client or visitor can accept or decline the call. If the client or visitor accepts the call, then the script code and the call management server facilitate establishing a peer-to-peer connection between the agent or representative and the client or visitor. Using the peer-to-peer connection, in real time, live video of the agent or representative can be transmitted to the client or visitor, and appear in a call interface via the browser, in association with a view of the website or a web page in the browser of the client or visitor. In this manner, agents of websites can initiate live video calls to website visitors or users; the visitor experiences what appears to be conventional web browsing with the addition of a live video view of an agent or representative. The visitor does not need to request or initiate the call but can control acceptance or denial of a call.

In this context, "owner" refers broadly to any person or entity that owns, operates, controls, manages, has authority over, or runs a website; legal title or ownership is not required, and an owner could be a webmaster or other formal or informal manager. The visit of the client to the website causes creating a socket connection between the client and the server. The server executes an application program to maintain a list of connected clients, and various metadata about the clients, which is presented to the website owner in an interface display. The owner can select any particular client among all the clients in the list, to initiate a peer-to-peer connection with that particular client and begin a call with them. The process executes without the client explicitly requesting a call.

In various aspects, features, and embodiments, the disclosure encompasses the subject matter of the following numbered clauses:

1. A computer-implemented method executed using a first computer functioning as a call management server, the method comprising accepting a first web socket connection between the first computer and a second computer that has visited a website that is hosted using a third computer; sending, to the third computer, data identifying the second computer; receiving, from a fourth computer that is associated with the third computer, a request to initiate and establish a call between the third computer and the second computer, and in response thereto, sending a call initiation message to the second computer; receiving, from the second computer, an acceptance message specifying acceptance of the call; receiving and forwarding between the second computer and the fourth computer messages to facilitate completion of a digital call connection between the second computer and the fourth computer under a peer-to-peer call control protocol; connecting a video camera associated with the fourth computer to the digital call connection to cause transmission, on the digital call connection from the fourth computer to the second computer and in real time, of live video from the camera.

2. The method of claim 1, further comprising receiving, from the second computer and the fourth computer, a plurality of negotiation messages formatted according to a peer-to-peer call control protocol and transmitting the plurality of negotiation messages respectively to the fourth computer or second computer to facilitate completion of a digital call connection according to the peer-to-peer call control protocol.

3. The method of claim 1, the live video being displayed at the second computer in a call user interface that is rendered on a display device of the second computer.

4. The method of clause 1, further comprising: transmitting bootstrap script code to the third computer, the bootstrap script code being programmed to be embedded in other code that defines a web page of the website of the third computer; receiving, from the second computer that has visited the web page, a request for a set of implementation script code, and in response thereto, transmitting the implementation script code to the second computer; accepting the first web socket connection between the first computer and the second computer during execution of the implementation script code by the second computer.

5. The method of clause 4, the implementation script code being programmed to cause rendering a call user interface on a display device of the second computer when the second computer executes the implementation script code.

6. The method of clause 5, the call user interface comprising a video window that receives and displays a first video image from a first digital video camera that is associated with the third computer; and a second video image from a second digital video camera that is associated with the second computer not being displayed until the first computer has received, from the second computer, the acceptance message specifying acceptance of the call.

7. The method of clause 4, the data identifying the second computer comprising digital data values specifying one or more of: the web page; what browser is in use at the second computer; a focus of browsing of the second computer; a language in use at the second computer; a location of the second computer, a display name of a user of the second computer; an email address of a user of the second computer.

8. The method of clause 1, further comprising generating a public key value that uniquely identifies the website owner, creating and storing the bootstrap script code to include the public key value, and transmitting the bootstrap script code to the website owner with the public key value.

9. The method of clause 8, further comprising: receiving a request to initiate the first web socket connection between the first computer and the second computer, the request including the public key value; establishing a call management socket connection between the first computer and the second computer; transmitting to the second computer, in response to a request on the call management socket connection, a call management web page that identifies one or more visitors that then currently have first web socket connections between the visitors and the website, the one or more visitors including the second computer, each of the visitors having transmitted to the first computer a socket initiation request that included the public key value by having executed the bootstrap script code.

10. The method of clause 1, further comprising: establishing a call management socket connection between the first computer and the second computer; transmitting to the second computer, in response to a request on the call management socket connection, a call management web page that identifies one or more visitors that then currently have first web socket connections between the visitors and the website, the one or more visitors including the second computer.

11. The method of clause 10, the request from the third computer to establish a call between the third computer and the second computer comprising a selection of one of the one or more visitors identified in the call management web page.

12. The method of clause 1, the peer-to-peer call control protocol comprising WEBRTC.

13. The method of clause 1, further comprising: using the fourth computer and using one or more of the first web socket connection or the digital call connection, requesting a browser of the second computer to transmit to the fourth computer, in real time, web page data defining a web page of the web site that the second computer is then currently browsing; using the fourth computer, receiving and rendering the web page in a call management web page that is displayed at the fourth computer.

14. The method of clause 13, the web page data comprising serialized document object model (DOM) elements of the web page.

15. A computer-implemented method that is executed in relation to a first computer functioning as a call management server, a second computer of a web site visitor, a third computer that hosts the website, and a fourth computer that is associated with the third computer, the method comprising: using the second computer: browsing the website and creating a first web socket connection between the first computer and the second computer; sending, to the third computer, data identifying the second computer; receiving, from a fourth computer that is associated with the third computer, a call initiation message that requests initiating a call between the third computer and the second computer; transmitting an acceptance message specifying acceptance of the call; receiving a plurality of negotiation messages formatted according to a peer-to-peer call control protocol and negotiating completion of a digital call connection between the second computer and the fourth computer according to the peer-to-peer call control protocol; rendering a call user interface via a browser of the second computer and receiving, in the call user interface, live video of a person who is associated with the fourth computer via the digital call connection and a video camera associated with the fourth computer.

2. Structural & Functional Overview 2.1 Example Distributed Computer System

Figure 1B:
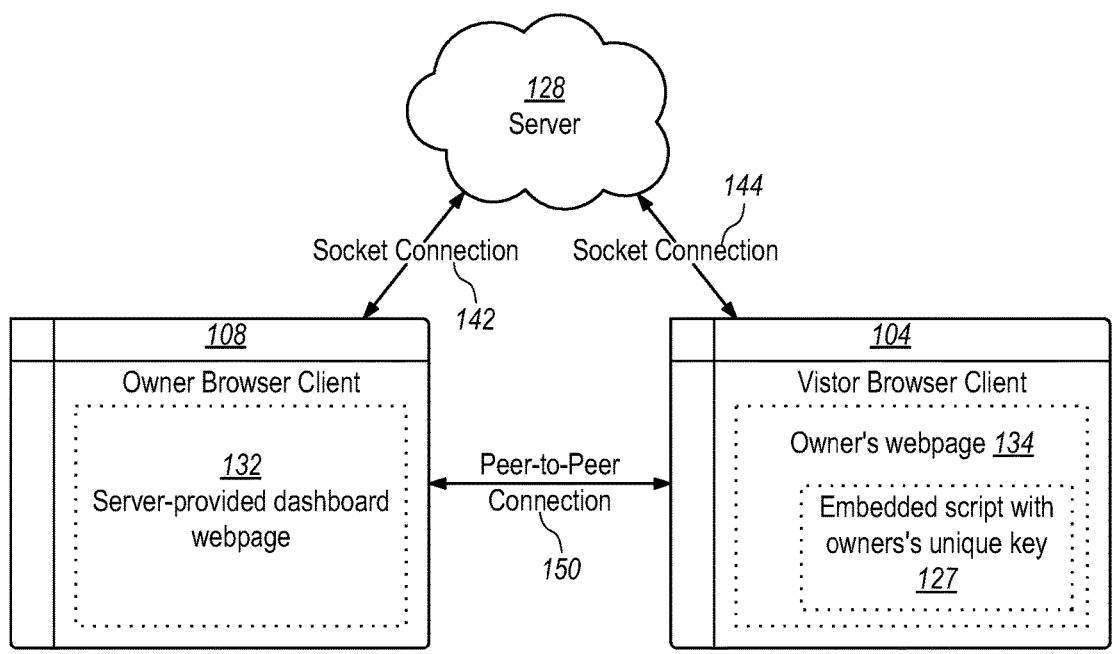
FIG. 1B illustrates architectural elements and electronic message paths in one embodiment.

FIG. 1A illustrates a distributed computer system showing the context of use and principal functional elements with which one embodiment could be implemented. FIG. 1B illustrates architectural elements and electronic message paths in one embodiment. Referring first to FIG. 1A, in an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1A, FIG. 1B illustrate only one of many possible arrangements of components configured to execute the programming described herein. Furthermore, FIG. 1A, FIG. 1B show a limited number of functional elements solely to illustrate clear examples. Other arrangements may include fewer or different components, and the division of work between the components may vary depending on the arrangement.

FIG. 1A, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example of FIG. 1A, a visitor computer 102, owner computer 106, and website 112 are communicatively coupled via network 110 to a server computer 120, thus forming a distributed computing system of four (4) computing elements. Each of the visitor computer 102 and owner computer 106 may comprise any kind of computing device such as a desktop computer, laptop computer, tablet computer, mobile computing device, or workstation. Visitor computer 102 broadly represents any computing device that any person or entity uses to request, receive, and render pages, documents, or files from a website 112 that also is communicatively coupled to network 110; the term "visitor" is used for convenience and other labels can be used in other embodiments, such as user, client, etc. Owner computer 106 broadly represents any employee, contractor, agent, or representative of the web site 112 or its owner; the term "owner" is used for convenience and other labels can be used in other embodiments, such as agent, representative, CSR, staff, sales, marketing, service, etc.

For clarity, FIG. 1A shows a single visitor computer 102, but in practical embodiments, system 100 can include thousands to millions of visitor computers depending upon the processing capacity of server computer 120. In some sections herein, server computer 120 is termed a first computer, the visitor computer 102 is termed a second computer, the website 112 or its hosting means is termed a third computer, and the owner computer 106 or an agent or representative associated with it is termed a fourth computer.

Visitor computer 102 executes application programs including a browser 104, and owner computer 106 executes application programs including a browser 108. Each of browser 104, 108 can comprise any application program that is compatible with open protocols such as HTTP and HTML; commercially available examples include CHROME, SAFARI, and EDGE.

Network 110 broadly represents any combination of one or more local area networks, wide area networks, campus networks, and internetworks, using any of terrestrial or satellite links, wired or wireless links. Network 110 provides digital electronic telecommunication between the visitor computer 102 and server computer 120, and between owner computer 106 and the server computer, using open protocols such as IP, TCP, HTTP.

The website 112 also is communicatively coupled to network 110, and can be a merchant site, shopping site offering products or services, service provider site, or site providing substantive application services to users or subscribers. Website 112 has an owner or operator. The owner or operator of website 112 uses one or more owner computers 106 with browsers 108 to manage the website and to interaction with server computer 120 to execute the functions that are further described herein. Further, browser 104 of visitor computer 102 can access website 112 and its pages, applications, or functions indirectly via network 110. A path 114 may represent browsing requests and responses of browser 104 in communication with website 112. In an embodiment, website 112 comprises or executes a web server 122 and web application 124. In an embodiment, web server 122 comprises an HTTP server that can respond to requests of visitor computer 102 and owner computer 106 and can include a firewall, load balancer, or other infrastructure to manage large numbers of requests. The web application 124 can implement any useful program application for visitor computer 102 and owner computer 106, such as a merchant or store application, or an application that provides substantive services in any industry or field of use, including but not limited to financial applications, education applications, government applications, agricultural applications, or others.

Server computer 120 represents any computing device that is capable of responding to requests from and providing services to a large number of end station devices such as visitor computer 102 and owner computer 106. In various embodiments, server computer 120 can comprise any of a single-machine processor, multi-processor machine, a processor or machine cluster, and/or one or more virtual computing instances in any of public datacenters and private datacenters. Server computer 120 can be implemented via AMAZON WEB SERVICES, MICROSOFT AZURE, and similar services to execute back-end services relating to call management, facilitating connections, data storage, analytics, and similar functions. Server computer 120 can be associated with a merchant, service provider, or any other person or entity that visitor computer 102 could need to visit or interact with.

In one embodiment, server computer 120 stores or can access boot script code 125 and a set of implementation script code 126 and can implement a call management application 129. Each of the boot script code 125 and implementation script code 126 comprises a set of browser-executable instructions formatted according to a programming language that browser 104 is capable of receiving, storing, executing, and using. Examples include JAVASCRIPT code, PYTHON code, GATEWAYSCRIPT, and others. The format, delivery, and use of the boot script code 125 and implementation script code 126 is described in other sections herein. In some embodiments, boot script 125 can be omitted and only a single set of script code can be used, with an implementation of all functions that are described herein can for one or both kinds of script code. The call management application 129 is programmed to monitor, receive data from, and output data concerning socket connections of browser 104 of visitor computer 102, as further described in other sections herein.

2.2 Example Functional Implementation

Referring now to FIG. 1B, in an embodiment, a server 128 is communicatively coupled via a first web socket connection 142 to the browser 108 of a user who is associated with an owner of the website 112. Server 128 can comprise one or more server processes or threads that execute at server computer 120 (FIG. 1A) via one or more of the functional elements of the server computer. The browser 108 of the website owner can transmit requests to call management application 129 (FIG. 1A) and retrieve from server 128, renders and displays a dashboard page 132, as described further in other sections herein. In one embodiment, the first socket provides a real-time updating list, in dashboard page 132, of all the visitors that are then currently connected to website 112.

The central server 128 maintains accounts for website owners and unique public keys to identify the accounts. Each of the public keys can be generated using Universally Unique IDs or UUIDs, by accessing and integrating code libraries that are commercially available for UUID generation. The server 128 provides the site owner with boot script code 125 for the site owner to embed in their webpages and that will execute for each site visitor, such as visitor computer 102. In an embodiment, boot script code 125 is programmed to perform the following operations:

1. Fetches and injects the implementation script code 126, which contains a full implementation of the solution described herein. By first presenting boot script code 125, which separately loads and invokes the implementation script code 126, updated implementation script code can be created and stored at the central server 128, without the website owner needing to update the boot script code 125.

2. Implements a placeholder API that tracks calls to the implementation script code 126 as the implementation script code is loading, for execution later after the implementation script code has been fully fetched and launched.

3. Makes an initialization call to the implementation script code 126 that includes the unique public key of the website owner, so that the visitor is associated with the account of the owner.

TABLE 1 illustrates an example of boot script code 125 that can be used in one embodiment.

TABLE 1

EXAMPLE BOOT SCRIPT CODE

```
// 1. Injects the full implementation script into the page
var script = d.createElement('script');
script.src = 'https://cdn.servicebell.com/main.js';
document.head.appendChild(script);
// 2. Implements a placeholder API that queues calls to
the implementation
if (!window.ServiceBell) {
    window.ServiceBell = function(method, ...args) {
        window.ServiceBell.q.push([method, args]);
    }
    window.ServiceBell.q = [ ];
}
// 3. Initializes the implementation with the website owner
public key
ServiceBell("init", "website-owner-key-a632ed");
```

After the owner of the website embeds the boot script code into their website, the owner of the website can use browser 108 of owner computer 106 to visit a dashboard page 132, which the server 128 serves, that shows a list of visitor computers 102 or visitor browsers 104 that are currently visiting the website of the owner and have an active connection to the server.

Figure 2A:
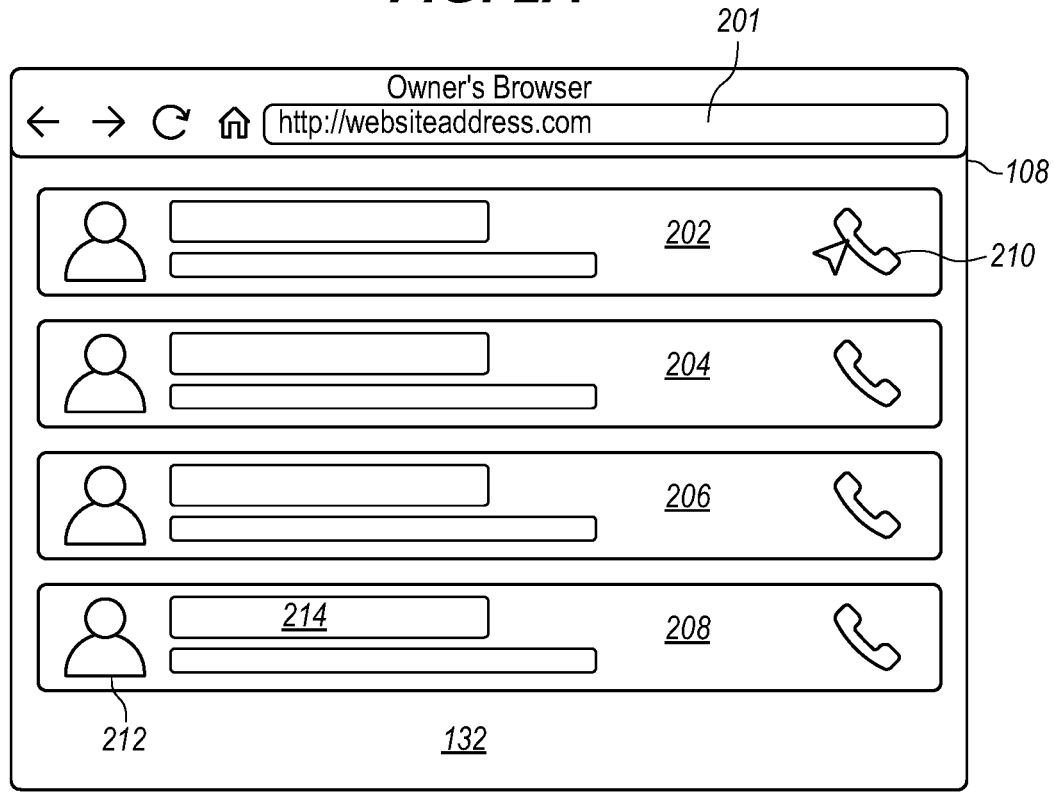
FIG. 2A illustrates a computer display device with a graphical user interface representing one view that could be used in a browser of an agent or representative of a website, in one embodiment.

FIG. 2A illustrates a computer display device with a graphical user interface representing one view that could be used in a browser of an agent or representative of a website, in one embodiment. In the example of FIG. 2A, browser 108 of owner computer 106 renders and generates a screen display that includes the dashboard page 132. In one embodiment, a user of owner computer 106 specifies a URL of the server 128 in a network address field 201 of browser 108, which causes the server to generate and return HTML instructions to render the dashboard page 132. In an embodiment, dashboard page 132 comprises a plurality of user panels 202, 204, 206, 208, each of which represents a second socket connection 144 of a different visitor browser 104 that is then currently in active communication with the server 128. In this description, the label "second" for the second socket connection 144 is used to disambiguate from the first socket connection 142 but does not imply an ordering, count, or number.

In an embodiment, each of the user panels 202, 204, 206, 208 can comprise an active link or selectable icon 210, a user identifier 212, and user information 214, as further described below. In an embodiment, each of the user panels 202, 204, 206, 208 can comprise data identifying a different visitor to website 112, depending on what metadata has been received about the visitor; example data can include name, geographic location, length of browsing session, time of browsing session, browser type, device type, a title or name of a page that the visitor is then currently browsing, whether the visitor has authorized use of a camera or microphone. All such data can be included or summarized in each of the user panels 202, 204, 206, 208. Or, in some embodiments, each of the user panels 202, 204, 206, 208 can comprise only some of the foregoing data items, and selecting a particular user panel causes expanding that user panel in the dashboard page 132, to show all of the data items that are known about the visitor.

Referring again to FIG. 1B, in an embodiment, visitor browser 104 transmits HTTP requests to visit website 112 and receives, in response, an owner's webpage 134, meaning any page of the website 112, via web application 124 and web server 122. The owner's webpage 134 includes the boot script code 127 embedded in the page. Therefore, the visitor browser 104 receives and executes boot script code 127, which causes the visitor browser to request, receive, and execute implementation script code 126. During execution, the implementation script code 126 performs the following:

1. The visitor browser 104 obtains a new unique identification key so that the visitor browser client can be identified across multiple sessions. In one approach, visitor browser 104 fetches a UUID from a cookie file or other local storage. In another approach, such as when a cookie file is not present, visitor browser 104 generates a new unique identification key and stores the key in a cookie file or other local storage.

2. The visitor browser 104, under control of boot script code 127, opens a second socket connection 144 to the server 128, which includes the unique public key of the owner from the boot script code, and the unique identification key of the visitor browser client.

3. The second socket connection 144 remains open and provides to the server 128 information about the session, such as what browser visitor browser 104 is using, what page the visitor browser client is on, or identifying information, if provided by the website owner. In an embodiment, the information about the session can be formatted and rendered as the user information 214 of one of the user panels 202, 204, 206, 208 of dashboard page 132 (FIG. 2A). The user identifier 212 can comprise a static image, a number, or a thumbnail image if the user holds an account at web site 112 and an image is stored in a cookie or account record that the script can access.

4. The second socket connection 144 waits for incoming messages from the server 128 to initiate a voice or video call from the website owner. In an embodiment, a user of browser 108 who is associated with the website owner can initiate a call with a particular visitor browser 104 by selecting the link or icon 210 in dashboard page 132 (FIG. 2A) that corresponds to a particular visitor.

2.3 User Interface Examples

Figure 3A:
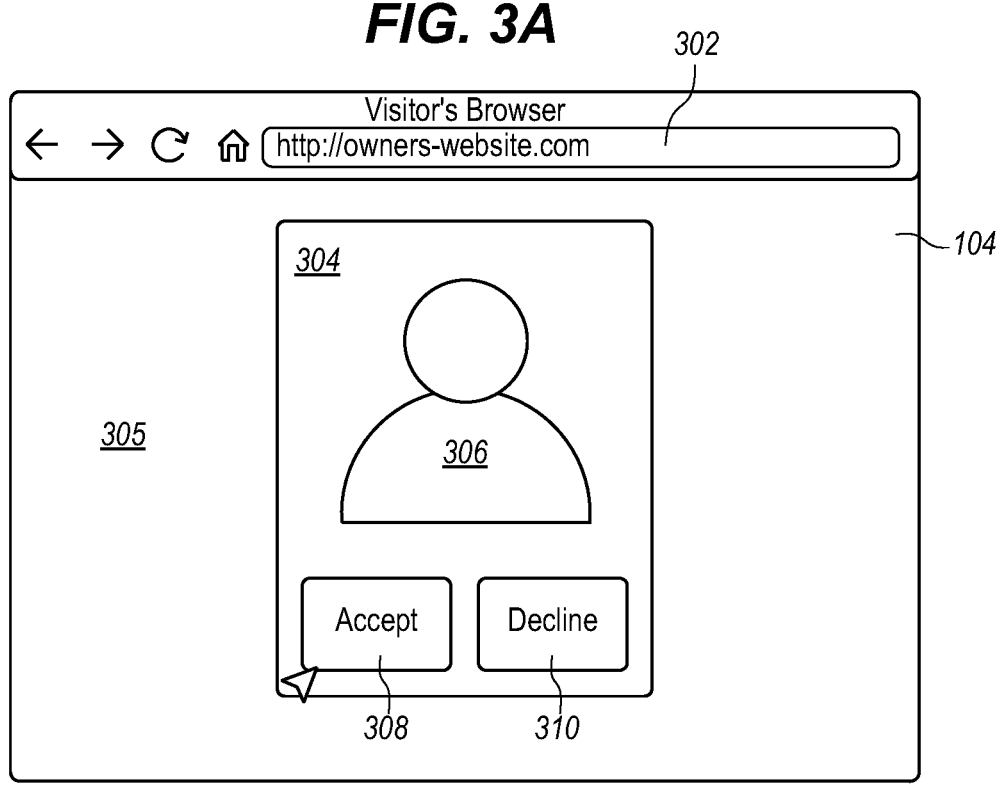
FIG. 3B illustrates a computer display device with a graphical user interface representing views that can be used in a browser of a visitor to a website, in one embodiment.
Figure 3B:
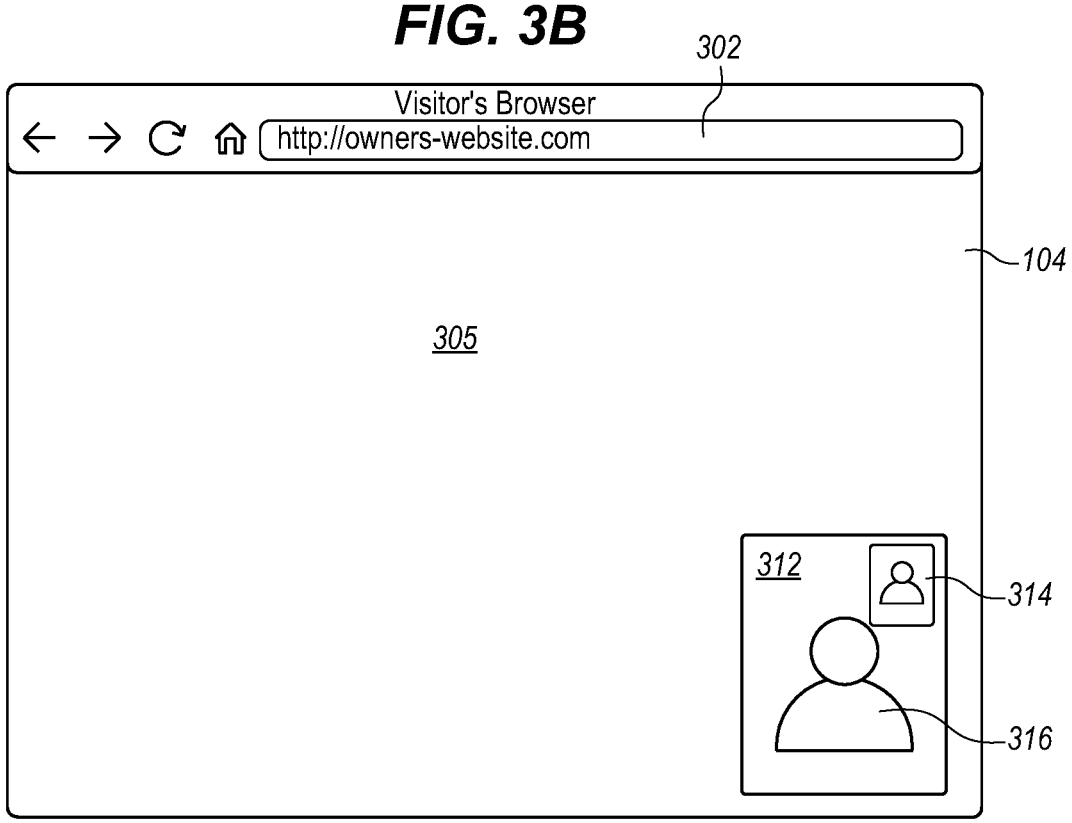

Once a voice or video call is initiated to the visitor, a user interface is rendered that facilitates the call. FIG. 3A, FIG. 3B illustrate a computer display device with a graphical user interface representing views that can be used in a browser of a visitor to a server computer, in one embodiment. Referring first to FIG. 3A, in an embodiment, visitor browser 104 accesses a URL of the website 112 of the owner, corresponding to web server 122 (FIG. 1A) as shown in network address field 302 of the browser. In response, the website 112 of the owner generates and returns a web page 305, which can include any content associated with the web application 124 (FIG. 1A).

In an embodiment, when a user of browser 108 who is associated with the website owner has initiated a call with the visitor browser 104 by selecting the link or icon 210 in dashboard page 132 (FIG. 2A), execution of the implementation script code 126 causes rendering a confirmation panel 304, which can be overlayed on web page 305 or shown using a pop-up window. The confirmation panel 304 can include a visual representation 306 of a caller at the website of the owner, such as a static image, thumbnail image, animated image, or video preview from a camera of a customer service representative of the website. In this manner, the visitor browser 104 receives an indication of who is seeking to contact them in an audiovisual call. In some embodiments, a call user interface comprises a video window that receives and displays a first video image from a first digital video camera that is associated with a computer of a representative of a website, but also involves a second video image from a second digital video camera that is associated with the visitor computer not being displayed until the server computer has received, from the visitor computer, the acceptance message specifying acceptance of the call.

The confirmation panel 304 can include an Accept link 308 and a Decline link 310, each of which can be programmed as an active link, selectable button, or other user interface widget. In an embodiment, input at visitor computer 102 via visitor browser 104 to select the Accept link 308 causes the implementation script 126 to signal the server 128 to open a peer-to-peer connection 150 (FIG. 1B) between the visitor browser 104 and owner browser 108, as further described in other sections herein. Further, once the peer-to-peer connection 150 is open, the implementation script 126 can be programmed to cause rendering the screen display of FIG. 3B. In the example of FIG. 3B, visitor browser 104 displays the same web page 305 as in FIG. 3A. However, under control of implementation script 126, confirmation panel 304 is removed and a reduced-size panel 312 is displayed in a position of the browser window that obscures less of the web page 305 while still allowing a legible display of the visual representation 306. The panel 312 also can be programmed to receive and display a video image 314 of the user of the computer 102 that is running visitor browser 104, if that computer has an operational camera. Thus, panel 312 can show both the current user, and the representative of the website 112 in the format of a live, real-time video call.

In an embodiment, input at visitor computer 102 via visitor browser 104 to select the Decline link 310 causes the implementation script to close the confirmation panel 304 with no other action.

2.4 Processing Method in Detail

Figure 4:
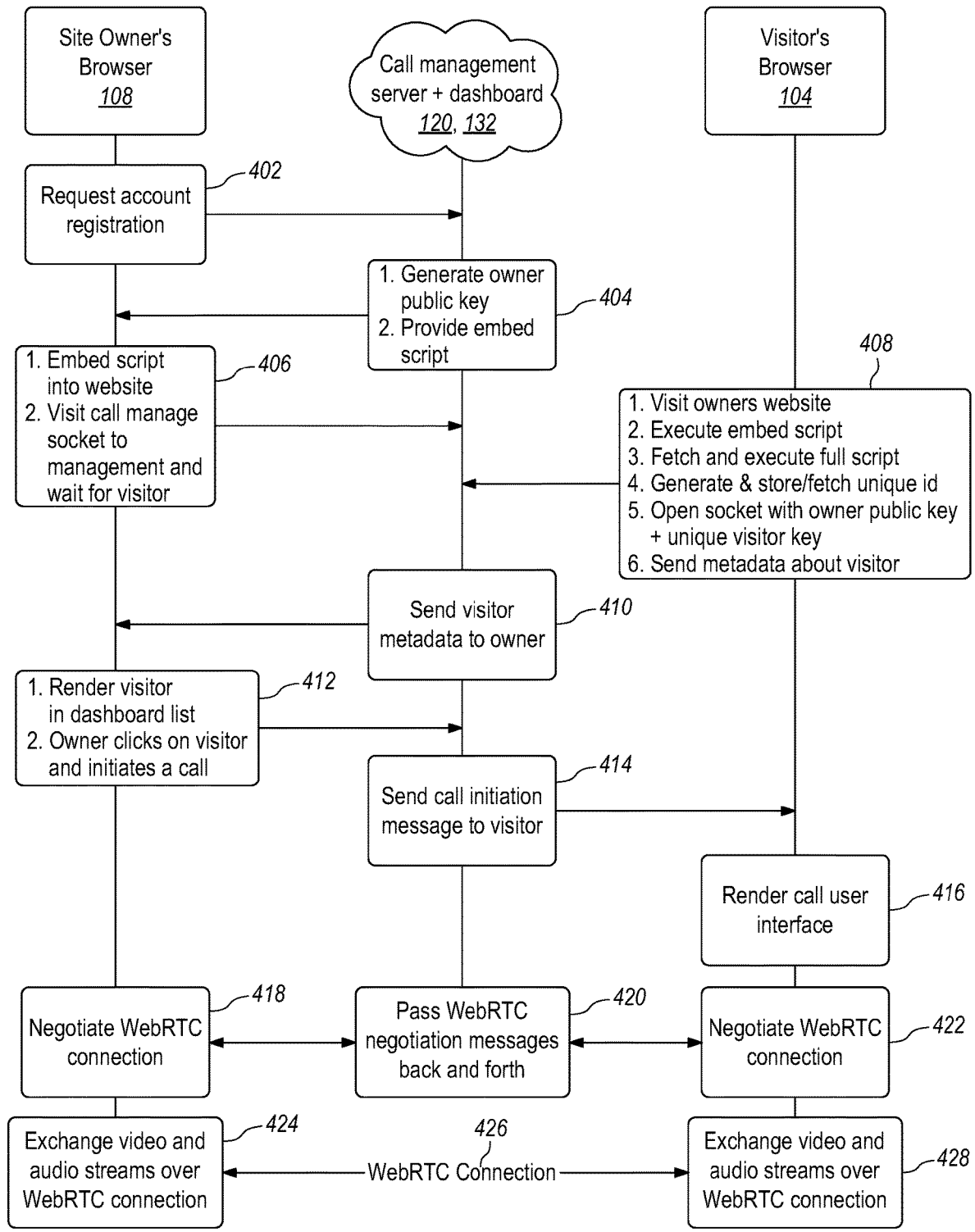
FIG. 4 illustrates an example computer-implemented process or algorithm that can be programmed to implement an embodiment.

FIG. 4 illustrates an example computer-implemented process or algorithm that can be programmed to implement an embodiment. FIG. 4 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program but are provided at the same functional level of illustration that is normally used at the high level of skill in this art to communicate the basis of developing working programs.

The example of FIG. 4 presents parallel flows of algorithmic steps that can be executed using browser 108 of a website owner, server computer 120 (FIG. 1) or server 128 implementing a call management server including visualizations in dashboard page 132, and browser 104 of a visitor. In an embodiment, operations 404, 410, 414, 420 can be programmed as a call management server or application as represented in FIG. 1 by web application 124. The call management server can be one of a plurality of servers, threads, or processes that the server computer 120, 128 execute.

In an embodiment, at operation 402, browser 108 of the website owner transmits a request for account registration to the server computer 120. The website owner can initiate a request using a specified URL of a web application executing at the server computer 120; for example, the server computer can implement an account enrollment dialog or wizard, subject to an approval chain or other checks to exclude unauthorized parties from obtaining accounts. As a result, the owner of a web site registers an account with the server.

At operation 404, the server generates a unique public key for the owner. Key generation can use any of several different approaches, including random number generation, pseudo-random number generation, executing a one-way hash over a set of data representing the website owner, or using a UUID generator. The resulting public key can comprise a digitally stored string value. At operation 404 the server also provides an embed script to embed in the owner's website. The bootstrap script code 125 can be the embed script. In an embodiment, each copy of the bootstrap script code 125 that the server computer 120 transmits to a web site 112 or a web site owner also includes the unique key of that website owner within the bootstrap script. As further described, including the public key or unique key of the website owner enables the server to associate, with the website owner, a request for a socket connection from a visitor computer executing the bootstrap script.

At operation 406, the website owner embeds the bootstrap script code 125 into its website; for example, the website owner can edit the HTML code of its INDEX.HTM page, or the equivalent, to add the bootstrap script code so that any visitor browser 104 that accesses the page will receive the bootstrap script code and execute it in the browser. At operation 406, the website owner also uses browser 108 to visit a call management socket to manage and wait for one or more visitors. For example, browser 108 contacts call management application 129 via the first socket connection 142. Visiting the call management socket can result in causing display of a dashboard 125, in some embodiments a boot script can be omitted so block 406 can be conflated with block 408 to deliver a single set of script code to the visitor browser 104.

At operation 408, a visitor browser visits the website 112 of the owner; executes the bootstrap script code 125, which causes fetching and executing the implementation script code 126; generates and stores, or fetches, a unique identifier for a session; opens the second socket connection 144 between the visitor browser 104 and the server, the socket connection including the owner public key and the unique identifier of the visitor. As previously noted in introducing bootstrap script code 125, in some embodiments a boot script can be omitted so block 406 can be conflated with block 408 to deliver a single set of script code to the visitor browser 104. In some embodiments, executing the implementation script code 126 can cause performing one or more qualification operations concerning visitors before opening the second socket connection 144. Qualification can include, for example, checking that the visitor browser 104 supports all features necessary for a peer-to-peer connection using a specified protocol, and/or for video calls.

Because the second socket connection 144 includes the owner public key, server computer 120 can link the socket and therefore the visitor with an account of the website owner. Linking can comprise creating and storing an association of the website owner account and the second socket connection 144 in a database table or memory-based data structure. In an embodiment, the unique identifier of the visitor can be persisted between multiple page visits in browser client storage, for example, using localStorage space or cookie files.

In an embodiment, visitor browser 104 can send metadata to the server computer 120 via the socket, as shown in operation 408. In various embodiments, the metadata can comprise values specifying one or more of: the page of the website that the visitor browser retrieved; what browser is in use; focus of browsing; language; location. In an embodiment, the website owner can modify the bootstrap script code 125 to add calls to an application programming interface (API) of the server computer 120 to cause obtaining, from the visitor browser, other metadata that the website owner wants to receive or analyze. Examples include a display name or email address of the visitor.

At operation 410, server computer 120 is programmed to send data identifying the visitor. For example, any of metadata concerning the visitor browser 104 previously described can be transmitted to the owner of the website. At operation 412, the dashboard page 132 can be dynamically updated to render a panel identifying the visitor browser 104 in the dashboard page. As seen in FIG. 1B, the first socket connection 142 can provide a real-time updating list in dashboard page 132 of all the currently connected visitors on website 112. The data identifying the visitor received via operation 410 can be used to populate panels, tiles, or other sections of the dashboard page 132 to provide details about visitors. By receiving the public key or unique key of a website owner in a socket connection request from the visitor, the call management server can associate the visitor with one website or owner among a plurality of different websites or owners and populate the correct dashboard page 132 for that website or owner. Further, whenever the second socket connection 144 of a visitor provides updated metadata, the updated information can be reflected in the visitor list of the dashboard page 132. Whenever a second socket connection 144 of a visitor is closed with the server computer 120, the visitor can be removed from the visitor list in the dashboard page 132.

As also shown in operation 412, the website owner browser 108 can initiate a call to any of the visitors from the server-provided list. As noted in other sections, unlike prior approaches, agents or representatives of websites can initiate calls and, as further described, website visitors can immediately see a video image of the agent or representative who is seeking to initiate a call, followed by the website visitor accepting or denying the call that the agent or representative initiated. An HTTP request, based on selecting a link in a web page, can function as a request to establish a call between the website owner browser 108 and a visitor. For example, link or icon 210 (FIG. 3) can be used to initiate a call. In an embodiment, as shown at operation 414, initiating a call causes transmitting a call initiation message from the server computer 120 to the visitor browser 104. In an embodiment, at operation 416, in response to receiving the call initiation message, the implementation script code 126 causes rendering a user interface for the call at the visitor browser, for example, using web pages and panels as shown in FIG. 3A, FIG. 3B. The implementation script code 126 also can initiate and send, from the visitor to the call management server, an acceptance message specifying acceptance of the call.

As seen in operation 418 to operation 428, inclusive, server computer 120 then facilitates initiating a peer-to-peer connection 150 between the browser 108 of the owner computer 106 and the visitor browser 104. The operation 418 to operation 428 can use a plurality of negotiation messages that are formatted according to a peer-to-peer call control protocol and can involve transmitting the plurality of negotiation messages respectively to the visitor browser 104 and website owner browser 108 to facilitate completion of a digital call connection according to the peer-to-peer call control protocol.

In one embodiment, operation 418 comprises the browser 108 initiating negotiating a WebRTC connection. At operation 420, the server computer 120 transmits and receives WebRTC negotiation messages between browser 108 of the owner of the website 112 and the visitor browser 104. Negotiation can include any operation specified in the WebRTC protocol and can include operations such as requesting and receiving access to cameras, microphones or other audiovisual devices of the computers 102, 106. Like operation 418, in operation 422, the visitor browser negotiates the WebRTC connection. In one embodiment, visitor browser 104 can immediately see and possibly hear the user of a camera and microphone of owner computer 106, but the visitor browser will be required to accept the call and enable video and voice devices from the visitor browser before the owner computer 106 can hear or see the user of the visitor computer 102.

At operations 424, 428, the browser 108 of the owner of the website 112 and the visitor browser 104 exchange video and audio streams over the WebRTC connection 426.

For purposes of illustrating a clear example, WebRTC is specified herein because it offers a means of connecting the computers 106, 102 for a low-latency video and audio call. Other embodiments can use other protocols for audio-only and/or audiovisual communication. A specification for WebRTC is published at the time of this writing at documents in the folder/TR/webrtc/of the domain w3.org on the World Wide Web.

2.5 Agent View of Visitor Web Browsing Activity

In some embodiments, the call management application 129 is programmed to interoperate with the owner computer 106 to reproduce, in the dashboard webpage 132, a view of the owner's webpage 134 that the visitor browser client 104 is browsing at the time that the visitor computer 102 connects to the website 112 and while the visitor computer is browsing the website. In broad terms, the methods described herein can be programmed for, using the fourth computer and using one or more of the first web socket connection or the digital call connection, requesting a browser of the second computer to transmit to the fourth computer, in real time, web page data defining a web page of the web site that the second computer is then currently browsing, and using the fourth computer, receiving and rendering the web page in a call management web page that is displayed at the fourth computer. In some embodiments, the web page data comprises serialized document object model (DOM) elements of the web page.

Figure 2B:
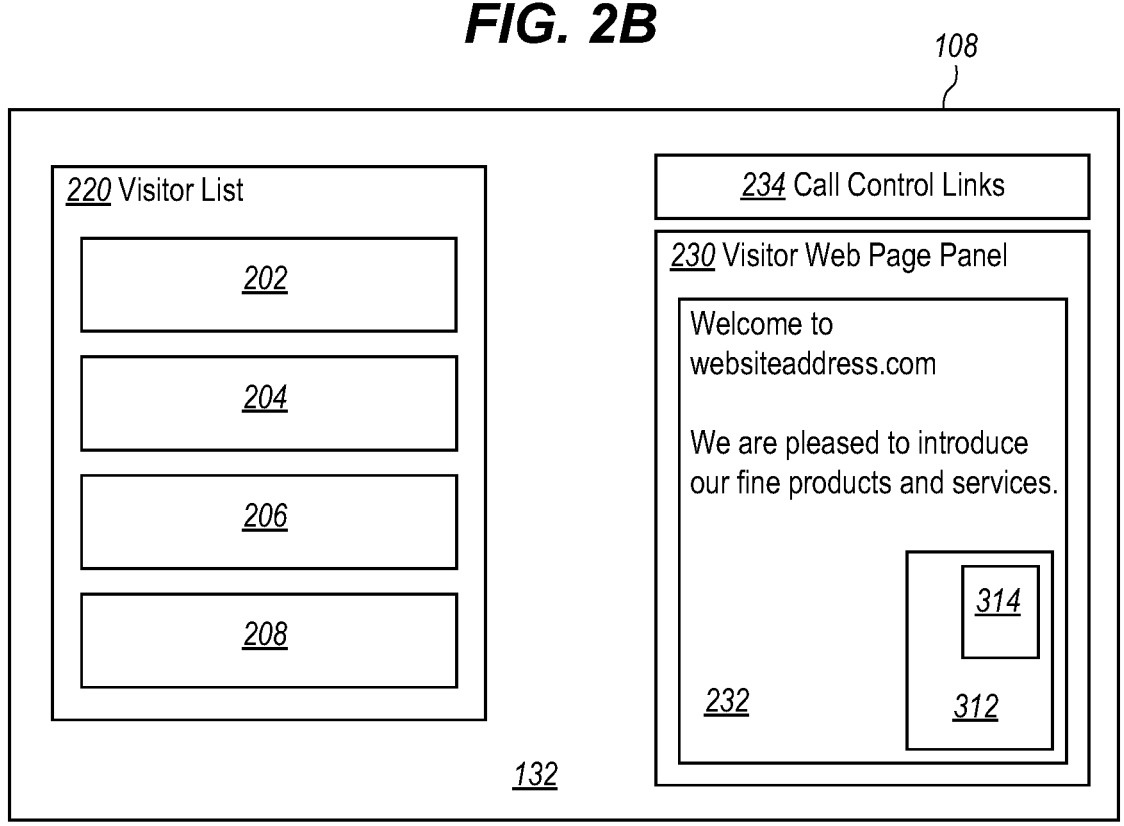
FIG. 2B illustrates a computer display device with a graphical user interface representing another view that could be used in a browser of an agent or representative of a website, in one embodiment.

FIG. 2B illustrates a computer display device with a graphical user interface representing a view that could be used in a browser of an agent or representative of a website, in one embodiment. In the example of FIG. 2B, browser 108 of owner computer 106 renders and generates a screen display that includes the dashboard page 132 that this disclosure introduced in describing FIG. 2A. In one embodiment, a user of owner computer 106 specifies a URL of the server 128 in a network address field 201 of browser 108, which causes the server to generate and return HTML instructions to render the dashboard page 132. In an embodiment, dashboard page 132 comprises a visitor list 220 having a plurality of user panels 202, 204, 206, 208, each of which represents a second socket connection 144 of a different visitor browser 104 that is then currently in active communication with the server 128. In an embodiment, each of the user panels 202, 204, 206, 208 can have the same active links and other elements that have been described for FIG. 2A.

Further, in an embodiment, dashboard page 132 comprises a visitor web page panel 230 that renders and displays a web page 232 comprising a copy of the same web page that the visitor computer 102 is then currently browsing. In some embodiments, visitor web page panel 230 is implemented by the call management application 129 using either the web socket connections 142, 144 between the owner browser client 108 or the peer-to-peer connection 150 to call the implementation script code 126 executing at the visitor browser client 104 to read and transmit the serialized DOM tree of the web page to the owner computer 106. The call management application 129 can integrate or embed a headless browser to receive, render, and display the DOM tree in visitor web page panel 230 to result in rendering web page 232 corresponding to whatever web page the visitor is then currently browsing. The call management application 129 can be programmed to receive periodic callbacks from the implementation script code 126 when the DOM tree of the visitor browser changes, and the implementation script code can be programmed to listen to event services of an operating system of the visitor computer 102 to detect changes to the DOM tree of page elements that the visitor computer has received and rendered and, in response, to call the call management application 129 to report an updated serialized DOM tree. In this manner, in real time, the owner browser 108 can continuously receive a view in visitor web page panel 230 of the exact web page 232 that the visitor is browsing. Streaming data transmission can be used between the script code and the call management application 129 and/or the owner computer 106 to transfer the serialized DOM tree of page elements and related metadata. Further, in some embodiments, callbacks from the script code can report or stream only updates to a prior DOM tree rather than always sending the entire DOM tree.

Furthermore, visitor web page panel 230 also can include a reproduction of the same confirmation panel 304 (FIG. 3A) as the visitor sees that panel when the agent initiates a call. Consequently, the agent or representative of the website 112, when viewing the dashboard page 132, will be able to confirm that the visitor computer 102 has received a call initiation request and can observe how the visitor responds to the request. Visitor web page panel 230 also can include the same reduced-size panel 312 (FIG. 3B) that is displayed in the browser window of the visitor computer 102 when a call initiation request is accepted, and a video call begins over the peer-to-peer connection 150. Panel 312 can include the same video image 314 of the user of the computer 102 that is running visitor browser 104, if that computer has an operational camera and the representative of the website 112 in the format of a live, real-time video call. All these displays are possible without the agent or representative requesting or requiring the visitor computer 102 to explicitly conduct a screen share operation.

In an embodiment, the implementation script code 126 is programmed to call back to call management application 129 using either the web socket connections 142, 144 between the owner browser client 108 or the peer-to-peer connection 150 to transmit data specifying that the panel 312 was instantiated and to provide real-time video corresponding to the video that has been received and displayed at the visitor computer 102. That is, the script code is programmed to detect that the confirmation panel 304 was instantiated and displayed, and to transfer data concerning these and other state changes of the visitor browser to the call management application 129 for use at the owner computer 106. Therefore, an agent or representative of the website can see, via dashboard 132, not only the web page 232 that the visitor computer 102 is browsing, but the same video that the visitor computer is seeing and can confirm that the connection is operating and that the visitor is seeing the view that the agent or representative expects to see.

In an embodiment, dashboard page 132 further comprises one or more call control links 234 that are programmed as active links to access functions of the call management application 129 relating to a call between the owner computer 106 or an agent or representative and with the visitor computer 102. Examples of call control links include End Call, to terminate an active call with a web page shown in visitor web page panel 230, and a Recording link to initiate a recording of the call between the visitor and agent.

Dashboard page 132 also can include a notification panel, status panel for the agent or representative, session history for the agent or representative, a chat facility for the agent or representative to communicate with others in the same entity, links to access analytics, activity, or billing functions, and other elements. Thus, FIG. 2B is illustrated in simplified, schematic format and could be programmed in a more complex and feature-rich manner in other embodiments.

Using the techniques of FIG. 4 in the context of distributed computer systems like FIG. 1A, FIG. 1B, optionally using the example user interfaces of FIG. 2A, FIG. 2B, FIG. 3A, FIG. 3B, the disclosure has provided an efficient computer-implemented method that allows an owner of a website to initiate voice and/or video calls with clients that are visiting the website of the owner in a manner that is simple for the visitor and can use fewer network resources than in prior approaches. Agents or representatives of website initiate calls, rather than the visitor requesting a call. The visit of the client to the website causes creating a socket connection between the client and the server. The server executes an application program to maintain a list of connected clients, and various metadata about the clients, which is presented to the website owner in an interface display. The owner can select any particular client among all the clients in the list, to initiate a peer-to-peer connection with that particular client and begin a call with them. The process executes without the client explicitly requesting a call. Consequently, a visitor to a website, and a representative of the website, can establish an audiovisual call rapidly and efficiently, then immediately begin addressing questions, requests, or requirements of the visitor. Needless network message roundtrips, arising from misunderstood text chat messages for example, can be avoided.

6. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
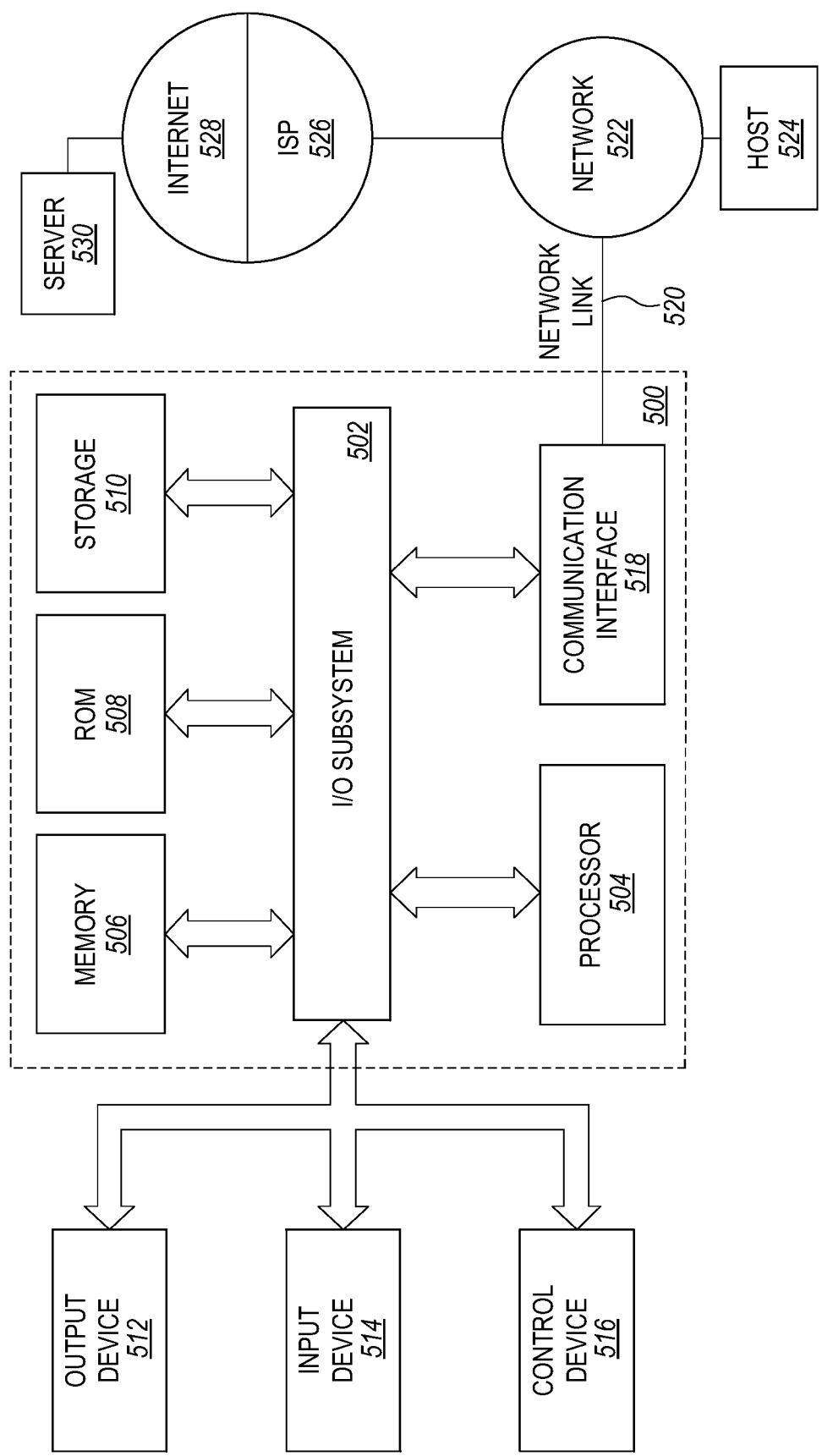
FIG. 5 illustrates a computer system with which one embodiment could be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed using a first computer functioning as a call management server, the method comprising:
   accepting a first web socket connection between the first computer and a second computer that has visited a web site that is hosted using a third computer;
   sending, to the third computer, data identifying the second computer;
   receiving, from a fourth computer that is associated with the third computer, a request to initiate and establish a call between the third computer and the second computer, and in response thereto, sending a call initiation message to the second computer;
   receiving, from the second computer, an acceptance message specifying acceptance of the call;
   receiving and forwarding between the second computer and the fourth computer messages to facilitate completion of a digital call connection between the second computer and the fourth computer under a peer-to-peer call control protocol;
   connecting a video camera associated with the fourth computer to the digital call connection to cause transmission, on the digital call connection from the fourth computer to the second computer and in real time, of live video from the camera;
   transmitting bootstrap script code to the third computer, the bootstrap script code being programmed to be embedded in other code that defines a web page of the website of the third computer;
   receiving, from the second computer that has visited the web page, a request for a set of implementation script code, and in response thereto, transmitting the implementation script code to the second computer;
   accepting the first web socket connection between the first computer and the second computer during execution of the implementation script code by the second computer.

2. The method of claim 1, further comprising receiving, from the second computer and the fourth computer, a plurality of negotiation messages formatted according to a peer-to-peer call control protocol and transmitting the plurality of negotiation messages respectively to the fourth computer or second computer to facilitate completion of a digital call connection according to the peer-to-peer call control protocol.

3. The method of claim 1, the live video being displayed at the second computer in a call user interface that is rendered on a display device of the second computer.

4. The method of claim 1, the implementation script code being programmed to cause rendering a call user interface on a display device of the second computer when the second computer executes the implementation script code.

5. The method of claim 4, the call user interface comprising a video window that receives and displays a first video image from a first digital video camera that is associated with the third computer; and
   a second video image from a second digital video camera that is associated with the second computer not being displayed until the first computer has received, from the second computer, the acceptance message specifying acceptance of the call.

6. The method of claim 1, the data identifying the second computer comprising digital data values specifying one or more of: the web page; what browser is in use at the second computer; a focus of browsing of the second computer; a language in use at the second computer; a location of the second computer, a display name of a user of the second computer; an email address of a user of the second computer.

7. The method of claim 1, further comprising generating a public key value that uniquely identifies a website owner, creating and storing the bootstrap script code to include the public key value, and transmitting the bootstrap script code to the website owner with the public key value.

8. The method of claim 7, further comprising:
   receiving a request to initiate the first web socket connection between the first computer and the second computer, the request including the public key value;
   establishing a call management socket connection between the first computer and the second computer;
   transmitting to the second computer, in response to a request on the call management socket connection, a call management web page that identifies one or more visitors that then currently have first web socket connections between the visitors and the website, the one or more visitors including the second computer, each of the visitors having transmitted to the first computer a socket initiation request that included the public key value by having executed the bootstrap script code.

9. The method of claim 1, further comprising:
   establishing a call management socket connection between the first computer and the second computer;
   transmitting to the second computer, in response to a request on the call management socket connection, a call management web page that identifies one or more visitors that then currently have first web socket connections between the visitors and the website, the one or more visitors including the second computer.

10. The method of claim 9, the request from the fourth computer to establish a call between the third computer and the second computer comprising a selection of one of the one or more visitors identified in the call management web page.

11. The method of claim 1, the peer-to-peer call control protocol comprising WEBRTC.

12. The method of claim 1, further comprising:
using the fourth computer and using one or more of the first web socket connection or the digital call connection, requesting a browser of the second computer to transmit to the fourth computer, in real time, web page data defining a web page of the web site that the second computer is then currently browsing;
using the fourth computer, receiving and rendering the web page in a call management web page that is displayed at the fourth computer.

13. The method of claim 12, the web page data comprising serialized document object model (DOM) elements of the web page.

14. A computer-implemented method that is executed in relation to a first computer functioning as a call management server, a second computer of a website visitor, a third computer that hosts the website, and a fourth computer that is associated with the third computer, the method comprising:
using the second computer:
browsing the website and creating a first web socket connection between the first computer and the second computer;
sending, to the third computer, data identifying the second computer;
receiving, from a fourth computer that is associated with the third computer, a call initiation message that requests initiating a call between the third computer and the second computer;
transmitting an acceptance message specifying acceptance of the call;
negotiating completion of a digital call connection between the second computer and the fourth computer according to the peer-to-peer call control protocol;
rendering a call user interface via a browser of the second computer and receiving, in the call user interface, live video via the digital call connection from a video camera associated with the fourth computer;
receiving bootstrap script code from the third computer, the bootstrap script code being programmed to be embedded in other code that defines a web page of the website;
transmitting a request for a set of implementation script code, and in response thereto, receiving the implementation script code at the browser;
creating the first web socket connection between the first computer and the second computer during execution of the implementation script code.

15. The method of claim 14, the implementation script code being programmed to cause rendering the call user interface.

16. The method of claim 15, further comprising rendering the call user interface only after the second computer has transmitted to the fourth computer an acceptance message specifying acceptance of the call.

17. The method of claim 14, the peer-to-peer call control protocol comprising WEBRTC.

18. One or more non-transitory computer-readable storage media storing instructions which, when executed using one or more processors, cause the one or more processors to execute, using a first computer functioning as a call management server:
accepting a first web socket connection between the first computer and a second computer that has visited a web site that is hosted using a third computer;
sending, to the third computer, data identifying the second computer;
receiving, from a fourth computer that is associated with the third computer, a request to initiate and establish a call between the third computer and the second computer, and in response thereto, sending a call initiation message to the second computer;
receiving, from the second computer, an acceptance message specifying acceptance of the call;
receiving and forwarding between the second computer and the fourth computer messages to facilitate completion of a digital call connection between the second computer and the fourth computer under a peer-to-peer call control protocol;
connecting a video camera associated with the fourth computer to the digital call connection to cause transmission, on the digital call connection from the fourth computer to the second computer and in real time, of live video from the camera;
transmitting bootstrap script code to the third computer, the bootstrap script code being programmed to be embedded in other code that defines a web page of the website of the third computer;
receiving, from the second computer that has visited the web page, a request for a set of implementation script code, and in response thereto, transmitting the implementation script code to the second computer;
accepting the first web socket connection between the first computer and the second computer during execution of the implementation script code by the second computer.

19. The computer-readable media of claim 18, further comprising further comprising sequences of instructions which when executed using the one or more processors cause executing: receiving, from the second computer and the fourth computer, a plurality of negotiation messages formatted according to a peer-to-peer call control protocol and transmitting the plurality of negotiation messages respectively to the fourth computer or second computer to facilitate completion of a digital call connection according to the peer-to-peer call control protocol.

20. The computer-readable media of claim 18, the live video being displayed at the second computer in a call user interface that is rendered on a display device of the second computer.

21. The computer-readable media of claim 18, further comprising further comprising sequences of instructions which when executed using the one or more processors cause executing generating a public key value that uniquely identifies a website owner, creating and storing the bootstrap script code to include the public key value, and transmitting the bootstrap script code to the website owner with the public key value.

22. The computer-readable media of claim 21, further comprising sequences of instructions which when executed using the one or more processors cause executing:
receiving a request to initiate the first web socket connection between the first computer and the second computer, the request including the public key value;
establishing a call management socket connection between the first computer and the second computer;
transmitting to the second computer, in response to a request on the call management socket connection, a call management web page that identifies one or more visitors that then currently have first web socket connections between the visitors and the website, the one or more visitors including the second computer, each of the visitors having transmitted to the first computer a socket initiation request that included the public key value by having executed the bootstrap script code.

23. The computer-readable media of claim 18, further comprising sequences of instructions which when executed using the one or more processors cause executing:

establishing a call management socket connection between the first computer and the second computer;
transmitting to the second computer, in response to a request on the call management socket connection, a call management web page that identifies one or more visitors that then currently have first web socket connections between the visitors and the website, the one or more visitors including the second computer.

24. The computer-readable media of claim 23, the request from the fourth computer to establish a call between the third computer and the second computer comprising a selection of one of the one or more visitors identified in the call management web page.

25. The computer-readable media of claim 18, the peer-to-peer call control protocol comprising WEBRTC.

26. The computer-readable media of claim 18, further comprising sequences of instructions which when executed using the one or more processors cause executing:

using the fourth computer and using one or more of the first web socket connection or the digital call connection, requesting a browser of the second computer to transmit to the fourth computer, in real time, web page data defining a web page of the web site that the second computer is then currently browsing;

using the fourth computer, receiving and rendering the web page in a call management web page that is displayed at the fourth computer.

27. The computer-readable media of claim 26, the web page data comprising serialized document object model (DOM) elements of the web page.

* * * * *